United States Patent
Yamamoto et al.

(10) Patent No.: US 10,369,545 B2
(45) Date of Patent: Aug. 6, 2019

(54) HONEYCOMB STRUCTURE

(71) Applicant: NGK INSULATORS, LTD., Nagoya (JP)

(72) Inventors: Hirotaka Yamamoto, Nagoya (JP); Yudai Kurimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 45 days.

(21) Appl. No.: 15/460,381

(22) Filed: Mar. 16, 2017

(65) Prior Publication Data

US 2017/0274354 A1 Sep. 28, 2017

(30) Foreign Application Priority Data

Mar. 25, 2016 (JP) .................................. 2016-061745

(51) Int. Cl.
*B01J 35/10* (2006.01)
*C04B 35/195* (2006.01)
(Continued)

(52) U.S. Cl.
CPC ........... *B01J 21/16* (2013.01); *B01J 35/0006* (2013.01); *B01J 35/04* (2013.01); *B01J 35/10* (2013.01);
(Continued)

(58) Field of Classification Search
CPC ............ B01D 2255/9205; B01D 35/04; B01D 35/10; B01J 35/04; B01J 35/10
(Continued)

(56) References Cited

U.S. PATENT DOCUMENTS 9,346,003 B2  5/2016  Suenobu et al.
2005/0095395 A1*  5/2005  Miwa .................... F01N 3/0222
428/116
(Continued)

FOREIGN PATENT DOCUMENTS

DE  102016003787 A1  10/2016
JP  2010227767 A  10/2010
(Continued)

OTHER PUBLICATIONS

U.S. Appl. No. 15/459,386, filed Mar. 15, 2017, Hirotaka Yamamoto et al.
(Continued)

*Primary Examiner* — Tri V Nguyen
(74) *Attorney, Agent, or Firm* — Burr & Brown, PLLC

(57) ABSTRACT

A honeycomb structure includes a honeycomb structure body including porous partition walls defining a plurality of cells serving as fluid passages extending from an inflow end face to an outflow end face. The partition walls have a porosity of 45 to 65%; the open frontal area of the pores having an equivalent circle diameter of 10 μm or more, of the pores open on the surface of each partition wall, is 20 to 50%; the pore density of the pores having an equivalent circle diameter of 10 μm or more is 200 to 1,000 pores/mm$^2$; the median opening diameter of the pores having an equivalent circle diameter of 10 μm or more is 40 to 60 μm; the circularity of the pores having an equivalent circle diameter of 10 μm or more is 1.8 to 4.0; and the partition walls have a wet area of 16,500 μm$^2$ or more.

9 Claims, 3 Drawing Sheets

(51) Int. Cl.
  *B01J 21/16* (2006.01)
  *B01J 35/00* (2006.01)
  *B01J 35/04* (2006.01)
  *B01J 37/00* (2006.01)
  *B01J 37/04* (2006.01)
  *B28B 3/20* (2006.01)
  *B28B 11/04* (2006.01)
  *B28B 11/24* (2006.01)
  *F01N 3/20* (2006.01)
  *F01N 3/28* (2006.01)
  *C04B 38/00* (2006.01)
  *B01D 53/94* (2006.01)
  *B01J 37/34* (2006.01)
  *C04B 111/00* (2006.01)

(52) U.S. Cl.
  CPC ........... *B01J 37/0018* (2013.01); *B01J 37/04* (2013.01); *B28B 3/20* (2013.01); *B28B 11/041* (2013.01); *B28B 11/241* (2013.01); *B28B 11/243* (2013.01); *C04B 38/0006* (2013.01); *C04B 38/0009* (2013.01); *F01N 3/2066* (2013.01); *F01N 3/2828* (2013.01); *F01N 3/2892* (2013.01); *B01D 53/9454* (2013.01); *B01D 2255/9205* (2013.01); *B01J 37/346* (2013.01); *B28B 2003/203* (2013.01); *C04B 2111/0081* (2013.01); *F01N 2570/14* (2013.01); *Y02A 50/2324* (2018.01); *Y02A 50/2325* (2018.01); *Y02T 10/22* (2013.01); *Y02T 10/24* (2013.01)

(58) Field of Classification Search
  USPC .................................................. 428/116, 118
  See application file for complete search history.

(56) References Cited

U.S. PATENT DOCUMENTS

| | | |
|---|---|---|
| 2007/0225149 A1 | 9/2007 | Hayashi et al. |
| 2007/0259153 A1* | 11/2007 | Noguchi .............. C04B 35/195 428/116 |
| 2010/0242424 A1 | 9/2010 | Harada et al. |
| 2013/0059724 A1* | 3/2013 | Hirose .............. B01D 46/2429 502/80 |
| 2013/0071608 A1 | 3/2013 | Suenobu et al. |
| 2013/0236687 A1* | 9/2013 | Hirose .................. B01J 35/002 428/116 |
| 2016/0288113 A1 | 10/2016 | Hirose et al. |

FOREIGN PATENT DOCUMENTS

| | | |
|---|---|---|
| JP | 2013-063422 A1 | 4/2013 |
| WO | 2005090263 A1 | 1/2008 |

OTHER PUBLICATIONS

German Office Action from a corresponding German patent application (DE 10 2017 002 576.2) dated May 3, 2019, 5 pages.

Japanese Third Party Offer of Information from a corresponding Japanese patent application (JP 2016-061745) bearing a mailing date of May 17, 2019, 1 page.

* cited by examiner

HONEYCOMB STRUCTURE

The present application is an application based on JP-2016-61745 filed on Mar. 25, 2016 with Japan Patent Office, the entire contents of which are incorporated herein by reference.

BACKGROUND OF THE INVENTION

Field of the Invention

The present invention relates to a honeycomb structure. More specifically, the present invention relates to a honeycomb structure having an excellent exhaust gas diffusibility, capable of improving a purification performance as compared with conventional honeycomb structures when a predetermined amount of a catalyst is loaded onto, and capable of preventing the increase in pressure loss when the structure is used.

Description of the Related Art

In recent years, the awareness of environmental issues has increased in the entire society. In the technical field in which fuel is burned to generate power, various techniques have been developed to remove harmful components such as nitrogen oxides from the exhaust gas generated, for example, when fuel is burned. For example, to remove harmful components such as nitrogen oxides from the exhaust gas emitted from automobile engines, various techniques have been developed. To remove a harmful component in such an exhaust gas, a catalyst is typically used to cause the harmful component to undergo chemical reaction into another component that is comparatively harmless. As a catalyst carrier for loading the catalyst for purification of an exhaust gas, a honeycomb structure is used.

As a conventional honeycomb structure for such a purpose, a honeycomb structure including a honeycomb structure body has been disclosed. This honeycomb structure body includes porous partition walls defining a plurality of cells serving as fluid passages extending from an inflow end face to an outflow end face (for example, see Patent Document 1). Patent Document 1 discloses a honeycomb structure in which the porosity and the average pore diameter of the partition walls are specified within particular ranges.

[Patent Document 1] JP-A-2013-63422

SUMMARY OF THE INVENTION

As the regulation of exhaust gas has been more strict, and a loading amount of a catalyst loaded onto a honeycomb structure used as a member for purification of an exhaust gas has been on an increasing trend in recent years. In other words, to meet a stricter value of regulation of exhaust gas, it has been studied to allow a loading amount of a catalyst to be increased in the honeycomb structure and to improve the purification performance of a honeycomb structure. For example, in order to improve a performance of purifying NOx, there is proposed a method that an amount of a catalyst having a selective catalytic reduction function and having an excellent performance of purifying NOx, such as an SCR catalyst, is increased. There is proposed a method that increasing cell density allows the contact area between an exhaust gas and a catalyst to be increased. Alternatively, there is proposed a method that increasing a porosity of partition walls allows the amount of a catalyst loaded on a honeycomb structure to be increased.

When a conventional honeycomb structure is loaded with a catalyst in such an amount as to meet a strict value of regulation of exhaust gas, the passages (i.e., cells) defined by partition walls may become narrow to increase the pressure loss of the honeycomb structure. For example, when the ceramic honeycomb structure disclosed in Patent Document 1 is loaded with a catalyst in such an amount as to meet a stricter value of regulation of exhaust gas, the pressure loss is markedly increased to cause practical problems. In particular, in order to further improve the performance of purifying NOx in future, a honeycomb structure having a loading amount per unit volume of 400 g/L or more is required, for example. However, when a conventional honeycomb structure is loaded with a large amount of a catalyst, the pressure loss may increase, or the cell passages defined by partition walls may be clogged by the catalyst. Hereinafter, the clogging of cell passages by a catalyst is also referred to as "catalyst amount clogging".

In view of the above circumstances, the present invention has been made. The present invention provides a honeycomb structure having an excellent exhaust gas diffusibility, capable of improving a purification performance as compared with conventional honeycomb structures when a predetermined amount of a catalyst is loaded, and capable of preventing the increase in pressure loss when the structure is used.

According to the present invention, the following honeycomb structures are provided.

According to a first aspect of the present invention, a honeycomb structure includes a honeycomb structure body. The honeycomb structure body includes porous partition walls defining a plurality of cells serving as fluid passages extending from an inflow end face to an outflow end face. A porosity of the partition walls is from 45 to 65%. An open frontal area of pores having an equivalent circle diameter of 10 μm or more among pores open on surfaces of the partition walls is from 20 to 50%. A pore density of pores having an equivalent circle diameter of 10 μm or more among pores open on surfaces of the partition walls is from 200 to 1,000 pores/mm². A median opening diameter of pores having an equivalent circle diameter of 10 μm or more among pores open on surfaces of the partition walls is from 40 to 60 μm. The median opening diameter is a median value of the equivalent circle diameters. The circularity of pores having an equivalent circle diameter of 10 μm or more among the pores open on the surfaces of the partition walls is from 1.8 to 4.0. A wet area of the partition walls is 16,500 μm² or more.

According to a second aspect of the present invention, the honeycomb structure according to the first aspect is provided, wherein a wet area of the partition walls is 16,500 μm² or more and 21,500 μm² or less.

According to a third aspect of the present invention, the honeycomb structure according to the first or second aspects is provided, wherein a thickness of the partition walls is from 89 to 203 μm.

According to a fourth aspect of the present invention, the honeycomb structure according to any one of the first to third aspects is provided, wherein a cell density of the honeycomb structure body is from 31 to 140 cells/cm².

According to a fifth aspect of the present invention, the honeycomb structure according to any one of the first to fourth aspects is provided, wherein a material of the partition walls includes at least one material selected from the group consisting of cordierite, silicon carbide, aluminum titanate, silicon nitride, and mullite.

According to a sixth aspect of the present invention, the honeycomb structure according to any one of the first to fifth aspects is provided, further comprising a plugging portion configured to plug one end of the cells formed in the honeycomb structure body.

According to a seventh aspect of the present invention, the honeycomb structure according to any one of the first to sixth aspects is provided, wherein a catalyst for purification of an exhaust gas is loaded onto at least one of the surfaces of the partition walls and pores of the partition walls of the honeycomb structure body.

According to an eighth aspect of the present invention, the honeycomb structure according to the seventh aspect is provided, used for a purification of NOx contained in an exhaust gas emitted from an automobile.

According to a ninth aspect of the present invention, the honeycomb structure according to the seventh or eighth aspects is provided, wherein the catalyst is a catalyst having a selective catalytic reduction function.

The honeycomb structure of the present invention has an excellent exhaust gas diffusibility, can improve a purification performance as compared with conventional honeycomb structures when a predetermined amount of a catalyst is loaded, and can prevent the increase in pressure loss when the structure is used. The honeycomb structure of the present invention also has an excellent isostatic strength. In other words, in the honeycomb structure of the present invention, specifying the pore diameter and other properties of the partition wall surface thus enables satisfactory catalyst filling performance to be achieved, and the increase in pressure loss to be prevented when the structure is used. In the honeycomb structure of the present invention, the partition walls are specified to have a wet area of 16,500 µm$^2$ or more, thus the contact area of the partition walls with an exhaust gas is increased, and the exhaust gas diffusibility is excellent. On this account, even when loaded with the same amount of a catalyst as that for a conventional honeycomb structure used as a member for a purification of an exhaust gas, the honeycomb structure can achieve a higher purification performance.

DESCRIPTION OF THE PREFERRED EMBODIMENTS

Embodiments of the present invention will now be described. The present invention is not limited to the following embodiments. It should be understood that changes, improvements, and other modifications may be appropriately made in the embodiments described below on the basis of ordinary knowledge of a person skilled in the art without departing from the scope of the present invention.

(1) Honeycomb Structure

Figure 1:
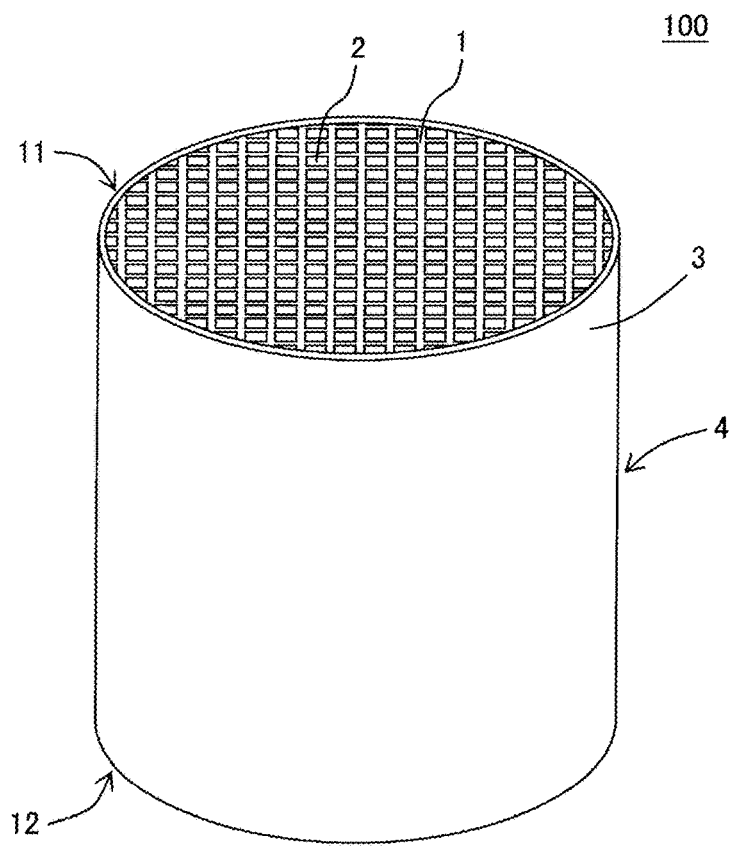
FIG. 1 is a schematic perspective view showing a honeycomb structure according to an embodiment of the present invention.
Figure 2:
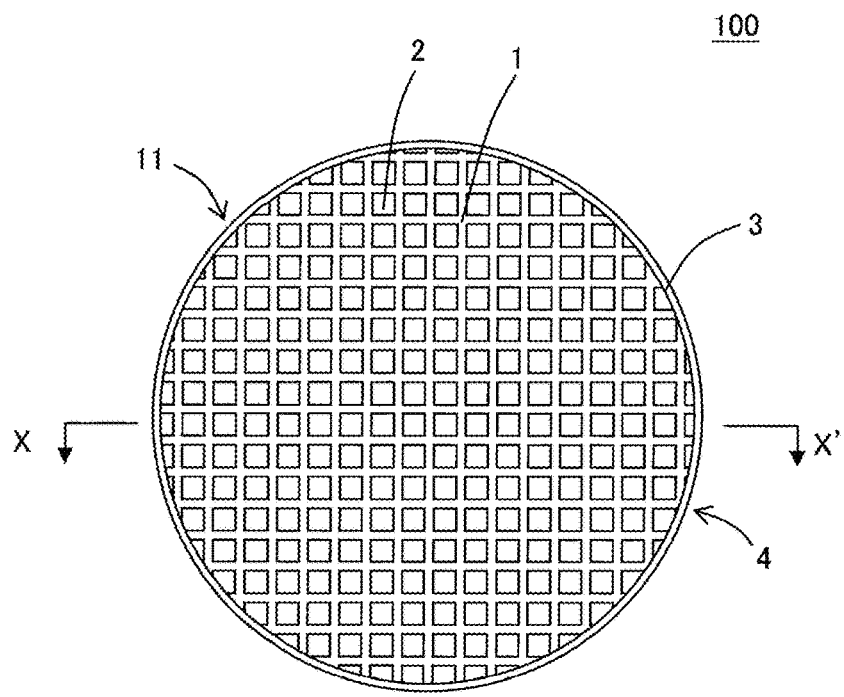
FIG. 2 is a schematic plan view showing an inflow end face of the honeycomb structure shown in FIG. 1.
Figure 3:
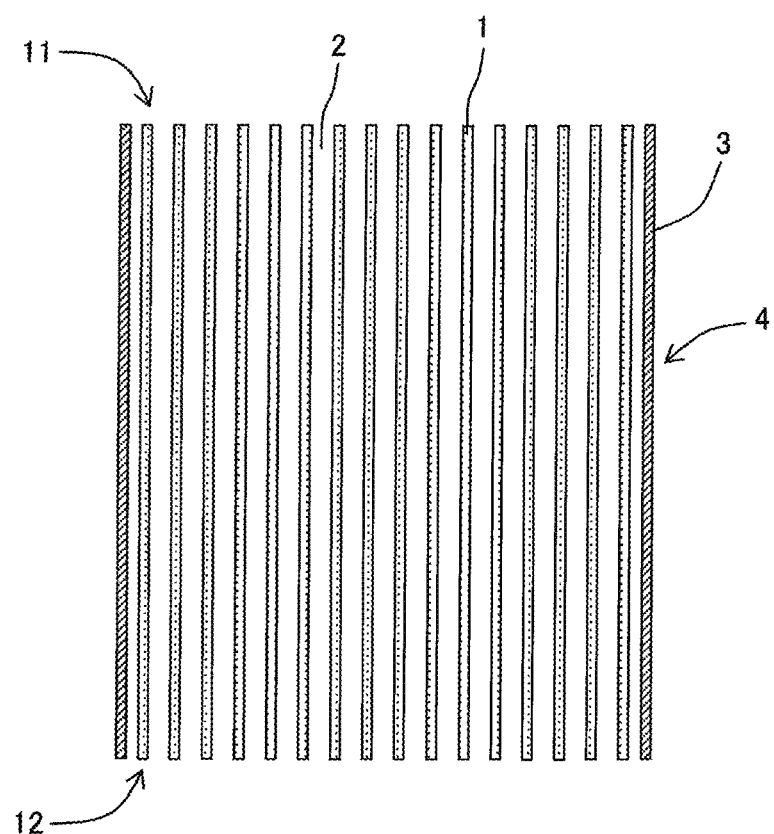
FIG. 3 is a schematic cross-sectional view taken along the line X-X' in FIG. 2.

As shown in FIG. 1 to FIG. 3, a honeycomb structure according to an embodiment of the present invention is a honeycomb structure 100 including a honeycomb structure body 4 including porous partition walls 1. The porous partition walls 1 define a plurality of cells 2 serving as fluid passages extending from an inflow end face 11 to an outflow end face 12.

The honeycomb structure body 4 shown in FIG. 1 to FIG. 3 includes a circumferential wall 3 arranged so as to surround a circumference of the partition walls 1 defining the cells 2. Here, FIG. 1 is a schematic perspective view showing a honeycomb structure according to an embodiment of the present invention. FIG. 2 is a schematic plan view showing the inflow end face of the honeycomb structure shown in FIG. 1. FIG. 3 is a schematic cross-sectional view taken along the line X-X' in FIG. 2.

The honeycomb structure 100 is characterized by including the honeycomb structure body 4 having the following structure. First, in the honeycomb structure body 4, a porosity of the partition walls is from 45 to 65%. An open frontal area of the pores having an equivalent circle diameter of 10 µm or more among pores open on surfaces of the partition walls 1, is from 20 to 50%. A pore density of the pores having an equivalent circle diameter of 10 µm or more among pores open on surfaces of the partition walls 1, is from 200 to 1,000 pores/mm$^2$. A median opening diameter of pores having an equivalent circle diameter of 10 µm or more among pores open on surfaces of the partition walls 1, is from 40 to 60 µm, where the median opening diameter is the median value of the equivalent circle diameters. A circularity of the pores having an equivalent circle diameter of 10 µm or more among pores open on surfaces of the partition walls 1, is from 1.8 to 4.0. In addition, the partition walls have a wet area of 16,500 µm$^2$ or more.

The honeycomb structure of the embodiment has an excellent exhaust gas diffusibility, can improve a purification performance as compared with conventional honeycomb structures when a predetermined amount of a catalyst is loaded, and can prevent the increase in pressure loss when the structure is used. The honeycomb structure of the embodiment also has an excellent isostatic strength. In other words, specifying the pore diameter and other properties of the partition wall surface enables the honeycomb structure of the embodiment to achieve a satisfactory filling performance of a catalyst and to prevent the increase in pressure loss when the structure is used. By specifying the partition walls to have a wet area of 16,500 µm$^2$ or more, the honeycomb structure of the embodiment has a larger contact area of the partition walls with an exhaust gas and has an excellent exhaust gas diffusibility. On this account, the honeycomb structure can achieve a higher purification performance even when loaded with the same amount of a catalyst as that for a honeycomb structure conventionally used as a member for a purification of an exhaust gas.

In the honeycomb structure of the embodiment, the porosity of the partition walls is determined with a mercury porosimeter. The mercury porosimeter includes Autopore 9500 (trade name) manufactured by Micromeritics. The porosity of the partition wall can be determined by the following procedure. First, a sample having a size of a length of 10 mm, a width of 10 mm, and a height of 10 mm is cut out from a honeycomb structure. Then, the pore volume of the sample is determined by a mercury porosimetry, and the porosity of the partition wall is calculated from the determined pore volume. When the porosity of a partition wall is 45% or less, the pressure loss of a honeycomb structure loaded with a catalyst markedly increases even though the other requirements for the honeycomb structure of the embodiment are satisfied. When the porosity of a partition wall exceeds 65%, the isostatic strength of a honeycomb structure deteriorates even though the other requirements are satisfied. The partition walls have a porosity of 45 to 65%, preferably 50 to 65%, and particularly preferably 55 to 65%.

In the present specification, the "equivalent circle diameter" is referred to as the diameter of a circle having the same area as the opening area of a pore. For example, when a pore has an open end that is not a circle, the area of the open end of the pore on a partition wall surface is determined, and then the equivalent circle diameter of the pore is calculated as two times the square root of the quotient of the area divided by the circular constant.

The equivalent circle diameter of a pore can be determined by the following procedure. First, a measurement sample having a size of a length of 20 mm, a width of 20 mm, and a height of 20 mm is cut out from a honeycomb structure body. The partition walls of the sample are not treated, and SEM images are recorded in randomly three visual fields on the surface of the partition walls under a scanning electron microscope (SEM). The sizes of a visual field are the width between partition walls and a length of 2 mm in the cell extending direction. The photographing magnification is not limited to particular values and is preferably 60 times. Next, each recorded image is binarized by an image analysis into cavity portions (i.e., pore portions) and portions other than the cavities (i.e., actual partition wall portions). The area of each cavity portion is determined. From the determined area, the equivalent circle diameter of each cavity portion is calculated. As the scanning electron microscope, S-3400N (trade name) manufactured by Hitachi High-Technologies can be used. The image analysis of a recorded image can be performed by using an image processing software, Image-Pro Plus (trade name) manufactured by Media Cybernetics, for example.

In the honeycomb structure of the embodiment, the above method classifies the pores open on the partition wall surface into pores having an equivalent circle diameter of 10 μm or more and pores having an equivalent circle diameter of less than 10 μm. The honeycomb structure of the embodiment is configured that the open frontal area, the pore density, the median opening diameter, and the circularity of the pores having an equivalent circle diameter of 10 μm or more are controlled to specific values.

In the honeycomb structure of the embodiment, the open frontal area of the pores having an equivalent circle diameter of 10 μm or more is from 20 to 50%. When the open frontal area is less than 20%, the pressure loss of a honeycomb structure loaded with a catalyst markedly increases even though the other requirements are satisfied. When the open frontal area exceeds 50%, the isostatic strength of a honeycomb structure deteriorates even though the other requirements are satisfied. The open frontal area of the pores having an equivalent circle diameter of 10 μm or more is from 20 to 50%, preferably from 25 to 50%, and particularly preferably from 30 to 45%.

The open frontal area of the pores having an equivalent circle diameter of 10 μm or more can be obtained by using the image analysis result for determining the equivalent circle diameter of pores. For example, in each image of three visual fields for determining the equivalent circle diameter of pores, the area of the cavity portions corresponding to the "pores having an equivalent circle diameter of 10 μm or more" is determined. The "open frontal area of the pores having an equivalent circle diameter of 10 μm or more" is calculated as the percentage of the determined area of the cavity portions divided by the area of the whole image. Here, the open frontal area of the pores having an equivalent circle diameter of 10 μm or more is the arithmetic mean value of the open frontal areas in the respective SEM images.

In the honeycomb structure of the embodiment, the pore density of the pores having an equivalent circle diameter of 10 μm or more is from 200 to 1,000 pores/mm$^2$. The "pore density of the pores having an equivalent circle diameter of 10 μm or more" is referred to as the number of the pores that have an equivalent circle diameter of 10 μm or more and are open per 1 mm$^2$ in a partition wall surface. When the pore density is less than 200 pores/mm$^2$, the pressure loss of a honeycomb structure loaded with a catalyst markedly increases even though the other requirements are satisfied. When the pore density exceeds 1,000 pores/mm$^2$, the isostatic strength of a honeycomb structure deteriorates even though the other requirements are satisfied. The pore density of the pores having an equivalent circle diameter of 10 μm or more is from 200 to 1,000 pores/mm$^2$, preferably from 250 to 700 pores/mm$^2$, and particularly preferably from 300 to 600 pores/mm$^2$.

The pore density of the pores having an equivalent circle diameter of 10 μm or more can be determined by using the image analysis result for determining the equivalent circle diameter of pores. For example, in each image of three visual fields for determining the equivalent circle diameter of pores, the number of the cavity portions corresponding to "the pores having an equivalent circle diameter of 10 μm or more" is determined. The "pore density of the pores having an equivalent circle diameter of 10 μm or more" is calculated as the determined number of the cavity portions divided by the area (mm$^2$) of the whole image. Here, the pore density of the pores having an equivalent circle diameter of 10 μm or more is the arithmetic mean value of the pore densities in the respective SEM images.

In the honeycomb structure of the embodiment, the median opening diameter of the pores having an equivalent circle diameter of 10 μm or more is from 40 to 60 μm, where the median opening diameter is the median value of the equivalent circle diameters. Hereinafter, the "median opening diameter of pores having an equivalent circle diameter of 10 μm or more, where the median opening diameter is the median value of the equivalent circle diameters", is simply referred to as the "median opening diameter of pores having an equivalent circle diameter of 10 μm or more". The "median opening diameter of pores having an equivalent circle diameter of 10 μm or more" can be determined by the following procedure. First, the equivalent circle diameters of pores open on a partition wall surface are determined by the above method. On the basis of the determined equivalent circle diameters, a graph is prepared, where the vertical axis is a cumulative area (%) of pores open on the partition wall surface, and the horizontal axis is an equivalent circle diameter (μm). In the prepared graph, the value of the equivalent circle diameter (μm) of pores at the cumulative area corresponding to 50% of the total pore area is the "median opening diameter of the pores having an equivalent circle diameter of 10 μm or more". The cumulative area corresponding to 50% of the total pore area is the value at which the value of the vertical axis representing cumulative area is 50% in the graph.

When the median opening diameter of pores having an equivalent circle diameter of 10 μm or more is less than 40 μm, a catalyst is hard to penetrate through the pores into the partition walls even though the other requirements are satisfied. When a fixed amount of a catalyst is loaded onto such a honeycomb structure, a large amount of the catalyst is loaded onto the partition wall surface, and the pressure loss of the honeycomb structure markedly increases. When the median opening diameter exceeds 60 μm, the isostatic strength of a honeycomb structure deteriorates, or the wet area of partition walls is reduced even though the other requirements are satisfied. The median opening diameter of the pores having an equivalent circle diameter of 10 μm or more is from 40 to 60 μm, preferably from 45 to 55 μm, and particularly preferably from 50 to 55 μm.

In the honeycomb structure of the embodiment, the circularity of the pores having an equivalent circle diameter of 10 μm or more among the pores open on the surfaces of the partition walls is from 1.8 to 4.0. The circularity of pores having an equivalent circle diameter of 10 μm or more is calculated by the following procedure. First, the opening area of a pore P whose circularity is to be obtained is regarded as $A_0$, and the outline length of the pore is regarded as L. The area of a circle having a circumferential length equal to the outline length L is regarded as $A_1$. The circularity of the pore P can be determined in accordance with $A_1/A_0$. The circularity of pores having an equivalent circle diameter of 10 μm or more can be determined by using the image analysis result for determining the equivalent circle diameter of pores. For example, in each image of three visual fields for determining the equivalent circle diameter of pores, the circularity of a cavity portion corresponding to "pores having an equivalent circle diameter of 10 μm or more" is determined by the above method. The obtained value is the circularity of each pore. Here, the circularity of pores having an equivalent circle diameter of 10 μm or more is the arithmetic mean value of the circularities of the respective "pores having an equivalent circle diameter of 10 μm or more" in the SEM images.

When the circularity of pores having an equivalent circle diameter of 10 μm or more is less than 1.8, the contact area between an exhaust gas and a catalyst is reduced even though the other requirements are satisfied, and thus such a condition is unfavorable. When the circularity of pores having an equivalent circle diameter of 10 μm or more exceeds 4.0, the pressure loss of a honeycomb structure may increase even though the other requirements are satisfied, and thus such a condition is unfavorable. The circularity of pores having an equivalent circle diameter of 10 μm or more is more preferably from 1.8 to 3.0 and particularly preferably from 1.8 to 2.5.

In the honeycomb structure of the embodiment, the partition walls have a wet area of 16,500 μm$^2$ or more. When the wet area of partition walls is less than 16,500 μm$^2$, the contact area between an exhaust gas and the partition walls is reduced, and the exhaust gas diffusibility deteriorates. On this account, when a honeycomb structure loaded with a catalyst on such partition walls is used, the contact frequency between the catalyst and an exhaust gas is reduced, and a sufficient purification performance is difficult to achieve. Here, the "wet area of partition walls" is referred to as the surface area of pores formed in the partition walls. The "wet area of partition walls" is calculated by using three-dimensional voxel data obtained by CT scan of a partition wall. The "voxel" is an element of a volume and represents a value on a regular grid in three-dimensional space. First, the thickness direction of a partition wall is defined as an X direction, the axis direction of a cell is defined as a Y direction, and the X-Y plane is defined as a photographing cross section. Next, a partition wall is subjected to CT scan while the photographing cross section is shifted in a Z direction perpendicular to the X and Y directions, and a plurality of images are recorded. Voxel data is obtained on the basis of the image data. Each resolution in the X, Y, and Z directions is 1.2 μm, and a resulting 1.2-μm cube is a minimum unit of three-dimensional voxel data, or a voxel. The image data of a photographing cross section obtained by CT scan is a flat data without thickness in the Z direction, but each photographing cross section is handled to have a thickness corresponding to the space between photographing cross sections in the Z direction. The size of the voxel data is a rectangular parallelepiped having sizes of 300 μm in the X direction, 480 μm in the Y direction, and 480 μm in the Z direction. The position of each voxel is represented by X, Y, Z coordinates, and a voxel is classified into a spatial voxel representing space (for example, a pore in a partition wall) or an object voxel representing an object. The classification between the spatial voxel and the object voxel is performed by binarization using modal method in the following manner. A plurality of image data actually obtained by CT scan is luminance data on the respective X, Y, Z coordinates. The luminance data is used to prepare a luminance histogram of all the coordinates (i.e., all the pixels of a plurality of image data). In the histogram, the luminance value at a portion between two peaks (valley) is set as a threshold, and each luminance of coordinates is binarized by determining whether the luminance is larger or smaller than the threshold. In this manner, each voxel at coordinates is classified into a spatial voxel or an object voxel. Such CT scan can be performed by using SMX-160CT-SV3 manufactured by Shimadzu Corporation, for example.

Next, the voxel data is used to calculate the volume V of a partition wall and the wet area S of the partition wall. The volume V is the volume of all the voxels in the voxel data. In other words, the volume V is 69,120,000 μm$^3$ (=300 μm×480 μm×480 μm). The wet area S is calculated as the sum of the areas on the interface between spatial voxels and object voxels in the voxel data. More specifically, the wet area S is determined in accordance with wet area S=(the number of interfaces in voxel data)×(the area of a single interface). The area of a single interface is 1.44 μm$^2$ (=1.2 μm×1.2 μm). From the calculated volume V and wet area S, the wet area rate R (=S/V) (μm$^{-1}$) is calculated. The volume V is constant, and thus a "wet area rate R of 0.000239 μm$^{-1}$ or more" is also referred to as a "wet area S of 16,500 μm$^2$ or more".

When the thickness of a partition wall is less than 300 μm, the wet area rate R is calculated by using voxel data obtained from a sample having the same volume V. For example, the wet area rate R of a partition wall having a thickness of 150 μm is calculated by using the voxel data obtained from a sample having a double dimension of 960 μm in the Y direction.

The partition walls have a wet area of 16,500 μm$^2$ or more, preferably 16,500 μm$^2$ or more and 21,500 μm$^2$ or less, more preferably 17,000 μm$^2$ or more and 21,500 μm$^2$ or less, and particularly preferably 17,500 μm$^2$ or more and 21,500 μm$^2$ or less. When the wet area of partition walls exceeds 21,500 μm$^2$, the pore diameter is required to be smaller, and a catalyst is difficult to fill into the partition walls. Hence, the wet area is more preferably 19,500 μm$^2$ or less.

The method of making partition walls have a wet area of 16,500 μm$^2$ or more includes a method of adding a predetermined amount of silica gel to a raw material when a honeycomb structure is manufactured from ceramics, for example. In other words, the wet area of partition walls can be increased by using a ceramic raw material containing silica gel to manufacture a honeycomb structure. In addition, by adjusting the amount of silica gel contained in the ceramic raw material and the particle diameter and the amount of a pore former, the wet area of partition walls and the open frontal area, the pore density, and the median opening diameter on the partition wall surface can be controlled.

In the honeycomb structure of the embodiment, a thickness of the partition walls is preferably from 89 to 203 µm, more preferably from 114 to 203 µm, and particularly preferably from 114 to 140 µm. When the thickness of the partition walls is less than 89 µm, the isostatic strength of a honeycomb structure body may deteriorate. In addition, the amount of a catalyst capable of being loaded in the pores of the partition walls is reduced, and the pressure loss of a honeycomb structure may increase when a catalyst is loaded onto in an amount more than a particular amount. When the thickness of the partition walls exceeds 203 µm, the excess thickness of the partition walls may allow the pressure loss to increase at the time of use.

In the honeycomb structure of the embodiment, the cell density is preferably from 31 to 140 cells/cm$^2$, more preferably from 47 to 93 cells/cm$^2$, and particularly preferably from 47 to 62 cells/cm$^2$. When the cell density is less than 31 cells/cm$^2$, the purification performance of a honeycomb structure used as a catalyst carrier may deteriorate. When the cell density exceeds 140 cells/cm$^2$, the pressure loss may increase at the time of use.

There is not any special restriction on a material of the honeycomb structure body. The material for the partition walls of the honeycomb structure body includes ceramics. In particular, in the honeycomb structure of the embodiment, the partition walls are preferably formed from at least one material selected from the group consisting of cordierite, silicon carbide, aluminum titanate, silicon nitride, and mullite. The partition walls are more preferably formed from at least one material of cordierite, aluminum titanate, and silicon carbide. The component of the partition walls particularly preferably contains 85% by mass or more of cordierite.

There is not any special restriction on a cell shape of cells formed in the honeycomb structure body. The cell shape of the cells in a cross section perpendicular to the extending direction of the cells can include a polygonal shape, a circular shape, and an elliptical shape. The polygonal shape may include a triangular shape, a quadrangular shape, a pentagonal shape, a hexagonal shape, and an octagonal shape. As for the cell shape, all the cells may have the same shape, or the cells may have different shapes each other. For example, quadrangular cells and octagonal cells may be mixed. As for the cell size, all the cells may have the same size, or the cells may have different sizes each other. For example, of a plurality of cells, some cells may have a larger size, and the other cells may have a smaller size.

There is not any special restriction on a shape of a honeycomb structure body. The shape of the honeycomb structure body may include a pillar shape in which the inflow end face and the outflow end face include a circular shape, an elliptical shape, a polygonal shape. For example, when the inflow end face and the outflow end face have a circular shape, the shape of the honeycomb structure body is a round pillar shape. The polygonal shape includes a quadrangular shape, a pentagonal shape, a hexagonal shape, a heptagonal shape, and an octagonal shape.

The sizes of the honeycomb structure body, for example, the length from the inflow end face to the outflow end face and the sizes of a cross section perpendicular to the cell extending direction in the honeycomb structure body are not limited to particular values. Each size can be appropriately set so as to achieve the optimum purification performance when the honeycomb structure of the embodiment is used as a member for purification of an exhaust gas. For example, the length from the inflow end face to the outflow end face of the honeycomb structure body is preferably from 76 to 254 mm and particularly preferably from 102 to 203 mm. The area of a cross section perpendicular to the cell extending direction in the honeycomb structure body is preferably from 2,027 to 99,315 mm$^2$ and particularly preferably from 16,233 to 85,634 mm$^2$.

In the honeycomb structure of the embodiment, a catalyst for purification of an exhaust gas may be loaded onto at least one of the surface of each partition wall and each pore of the partition wall of the honeycomb structure body. This honeycomb structure enables CO, NOx, HC, and the like in an exhaust gas to undergo catalytic reaction into harmless substances. A catalyst may preferably include a catalyst containing at least one element selected from the group consisting of noble metals, aluminum, nickel, zirconium, titanium, cerium, cobalt, manganese, zinc, copper, tin, iron, niobium, magnesium, lanthanum, samarium, bismuth, and barium. The noble metal may include platinum, rhodium, palladium, ruthenium, indium, silver, and gold. The above element may be contained as an elemental metal, a metal oxide, or other metallic compounds. In the honeycomb structure of the embodiment, the catalyst is more preferably a catalyst having a selective catalytic reduction function. The catalyst having a selective catalytic reduction function may include a metal-substituted zeolite. The metal for the metal substitution of zeolite may include iron and copper. The zeolite may preferably include β-zeolite. The catalyst having a selective catalytic reduction function may be a catalyst containing at least one substance selected from the group consisting of vanadium and titania, as the main component. In the catalyst having a selective catalytic reduction function, the content of vanadium and titania is preferably 60% by mass or more.

The loading amount of the catalyst is preferably 150 g/L or more, more preferably 200 g/L or more and 350 g/L or less, and particularly preferably 250 g/L or more and 350 g/L or less. When the loading amount of the catalyst is less than 150 g/L, the catalytic action may not be sufficiently exhibited. When the loading amount of the catalyst exceeds 350 g/L, the loaded catalyst may increase the pressure loss, or the production cost of a honeycomb structure may increase. The loading amount of a catalyst is the mass [g] of a catalyst loaded per 1 liter of a honeycomb structure. The method of loading a catalyst may include a method in which partition walls are wash-coated with a catalyst liquid containing a catalyst component and then the coated walls are subjected to a heat treatment at high temperature to be baked.

There is not any special restriction on a method for manufacturing the honeycomb structure of the embodiment, and the honeycomb structure can be manufactured by the following method, for example. First, a kneaded material having plasticity is prepared to obtain a honeycomb structure body. The kneaded material to prepare the honeycomb structure body can be prepared by suitably adding an additive such as a binder and water to raw material powder of a material selected from the group consisting of the above-mentioned suitable materials of the partition walls. For example, to manufacture the honeycomb structure of the embodiment, the kneaded material is preferably prepared from a ceramic raw material containing silica gel. The ceramic raw material containing silica gel includes a ceramic raw material containing 14% by mass or more of silica gel. The forming raw material for preparing the kneaded material includes a forming raw material containing 100% by mass of a ceramic raw material containing such an amount of silica gel as above and 2% by mass or more of a water absorbing polymer that is before water absorption and will have an average particle diameter of 20 μm or more after water absorption. The silica gel preferably has an average particle diameter of 8 to 20 μm.

Next, by means of the extrusion of the prepared kneaded material, a pillar-shaped honeycomb formed body having the partition walls which defines a plurality of the cells and the circumferential wall arranged at the outermost circumference is obtained. In the extrusion, a die having a predetermined cell shape, a predetermined thickness of the partition walls, and a predetermined cell density is preferably used as the die for the extrusion.

The obtained honeycomb formed body is dried by microwaves and hot air, for example. Next, the open ends of the cells are plugged with the same material as that used for manufacturing the honeycomb formed body, and a plugging portion is provided, as needed. After the formation of the plugging portion, the honeycomb formed body may be further dried.

Next, the honeycomb formed body is fired to obtain a honeycomb structure. The firing temperature and the firing atmosphere vary with raw materials, and a person skilled in the art can select the firing temperature and the firing atmosphere suitable for a selected material. For example, to manufacture a honeycomb structure containing cordierite, the temperature of the firing atmosphere is preferably set to 1,350 to 1,440° C. The firing atmosphere for manufacturing a honeycomb structure containing cordierite is preferably nitrogen. As for the firing time, a maximum temperature is preferably maintained for 3 to 15 hours.

A catalyst may be loaded onto the obtained honeycomb structure. There is not any special restriction on a method for loading the catalyst onto the honeycomb structure, and the method may include a method in which the partition walls of a honeycomb structure are wash-coated with a catalyst liquid containing a catalyst component and then the coated walls are subjected to a heat treatment at high temperature to be baked.

EXAMPLES

Example 1

To 100 parts by mass a cordierite forming raw material, 2.0 parts by mass of a pore former, 60 parts by mass of a dispersing medium, 5.6 parts by mass of an organic binder, and 30 parts by mass of a dispersing agent were added, and the whole was mixed and kneaded to obtain a kneaded material. As the cordierite forming raw material, alumina, aluminum hydroxide, kaolin, talc, silica, and silica gel were used. The cordierite forming raw material was prepared in such a manner as to contain 14% by mass of silica gel in 100% by mass of the cordierite forming raw material. As the dispersing medium, water was used; as the pore former, a water-absorbing polymer having an average particle diameter of 20 μm was used; as the organic binder, hydroxypylmethyl cellulose was used; and as the dispersing agent, ethylene glycol was used. The water-absorbing polymer used was a particulate ammonium polyacrylate having a water-absorbing rate of 15 to 25 times and an average particle diameter of 20 μm after water absorption.

Next, the kneaded material was extruded by using a die for preparing a honeycomb formed body, a honeycomb formed body having a round pillar shape as a whole was obtained. The shape of the cell in the honeycomb formed body was a quadrangular shape.

The honeycomb formed body was then dried in a microwave dryer and further completely dried in a hot-air drier. Both end faces of the honeycomb formed body were cut down for adjustment to a predetermined size.

Next, the dried honeycomb formed body was degreased and fired, a honeycomb structure of Example 1 was manufactured. The degreasing was performed in a nitrogen atmosphere for 10 hours. The firing was performed in a nitrogen atmosphere for 80 hours.

The honeycomb structure of Example 1 had a round pillar shape whose inflow end face and outflow end face had a circular shape. Each diameter of the inflow end face and the outflow end face was 266.7 mm. The length of the honeycomb structure in the cell extending direction was 152.4 mm. In the honeycomb structure of Example 1, the thickness of the partition wall was 0.114 mm, and the cell density was 93 cells/cm$^2$. Table 1 shows the diameter of the end faces of the honeycomb structure, the length of the honeycomb structure, the thickness of the partition wall, and the cell density.

In the honeycomb structure of Example 1, the porosity of the partition walls was 50%. The porosity of the partition walls was measured with a mercury porosimeter (Autopore 9500 manufactured by Micromeritics). The porosity column in Table 1 shows the porosity value of the partition walls.

The open frontal area, the pore density, the median opening diameter, the wet area, and the circularity of the honeycomb structure of Example 1 were measured by the following methods. The open frontal area, the pore density, the median opening diameter, the wet area, and the circularity were determined for the pores having an equivalent circle diameter of 10 μm or more among the pores open on the partition wall surface. Table 1 shows the measurement results of the open frontal area, the pore density, the median opening diameter, the wet area, and the circularity.

[Open Frontal Area of Pores Having Equivalent Circle Diameter of 10 μm or More]

A measurement sample having a size of a length of 20 mm, a width of 20 mm, and a height of 20 mm was cut out from the honeycomb structure body of the honeycomb structure of Example 1. The partition walls of the sample were not treated, and SEM images were recorded in randomly three visual fields on the partition wall surface of the sample under a scanning electron microscope (SEM). The size of a visual field was the width between partition walls and a length of 2 mm in the cell extending direction. Next, each recorded image was binarized by an image analysis into cavity portions (i.e., pore portions) and portions other than the cavities (i.e., actual partition wall portions). The area of each cavity portion was determined. The equivalent circle diameter of each cavity portion was calculated by the determined area. The area of the cavity portions corresponding to the "pores having an equivalent circle diameter of 10 μm or more" was determined in the SEM image. The "open frontal area of the pores having an equivalent circle diameter of 10 μm or more" is calculated as the percentage of the determined area of the cavity portions divided by the area of the whole image. The open frontal area shown in Table 1 is the arithmetic mean value of the open frontal areas of the respective SEM images in the three visual fields.

[Pore Density of Pores Having Equivalent Circle Diameter of 10 μm or More]

In the same manner as in the measurement method of the open frontal area of pores having an equivalent circle diameter of 10 μm or more, the equivalent circle diameter of each cavity portion in an SEM image was calculated. The number of the cavity portions corresponding to the "pores having an equivalent circle diameter of 10 μm or more" was obtained in the SEM image. The "pore density of the pores having an equivalent circle diameter of 10 μm or more" is calculated as the obtained number of the cavity portions divided by the area (mm²) of the whole image. The pore density shown in Table 1 is the arithmetic mean value of the pore densities of the respective SEM images in the three visual fields.

[Median Opening Diameter of Pores Having Equivalent Circle Diameter of 10 μm or More]

In the same manner as in the measurement method of the open frontal area of pores having an equivalent circle diameter of 10 μm or more, the equivalent circle diameter of each cavity portion in an SEM image was calculated. The pores corresponding to the respective cavity portions in the SEM image were classified into pores having an equivalent circle diameter of 10 μm or more and pores having an equivalent circle diameter of less than 10 μm. On the basis of the obtained equivalent circle diameters, a graph was prepared, where the vertical axis was a cumulative area (%) of pores open on the partition wall surface, and the horizontal axis was an equivalent circle diameter (μm). In the prepared graph, the value of the equivalent circle diameter (μm) of pores at the cumulative area corresponding to 50% of the total pore area is the "median opening diameter of the pores having an equivalent circle diameter of 10 μm or more".

[Wet Area]

The wet area of the partition wall was calculated by using three-dimensional voxel data obtained by CT scan of the partition wall. First, the thickness direction of a partition wall was defined as an X direction, the axis direction of a cell was defined as a Y direction, and the X-Y plane was defined as a photographing cross section. Next, a partition wall was subjected to CT scan while the photographing cross section was shifted in a Z direction perpendicular to the X and Y directions, and a plurality of images were recorded. Voxel data was obtained on the basis of the image data. Each resolution in the X, Y, and Z directions was 1.2 μm, and a resulting 1.2-μm cube was a minimum unit of three-dimensional voxel data. The image data of a photographing cross section obtained by CT scan was a flat data without thickness in the Z direction, but each photographing cross section was handled to have a thickness corresponding to the space between photographing cross sections in the Z direction. The CT scan was performed with SMX-160CT-SV3 manufactured by Shimadzu Corporation. Next, the obtained voxel data was used to calculate the wet area S of the partition wall. Specifically, the wet area S was determined in accordance with wet area S=(the number of interfaces in voxel data)×(the area of a single interface). The area of a single interface was 1.44 μm² (=1.2 μm×1.2 μm).

[Circularity of Pores Having Equivalent Circle Diameter of 10 μm or More]

In the same manner as in the measurement method of the open frontal area of pores having an equivalent circle diameter of 10 μm or more, the equivalent circle diameter of each cavity portion in an SEM image was calculated. The opening area of a pore the circularity of which was to be determined and the outline length of the pore were obtained. The opening area of a pore P whose circularity is to be obtained is regarded as $A_0$, and the outline length of the pore is regarded as L. The area of a circle having a circumferential length equal to L is regarded as $A_1$. The circularity of the pore P can be determined in accordance with Equation (1). The respective circularities of the "pores having an equivalent circle diameter of 10 μm or more" in the SEM image were calculated, and the arithmetic mean value of the calculated circularities was regarded as the "circularity of pores having an equivalent circle diameter of 10 μm or more".

$$\text{circularity of pore } P = A_1/A_0 \quad \text{Equation (1)}$$

A catalyst was loaded onto the honeycomb structure of Example 1. First, a catalyst slurry containing an predetermined catalyst was prepared. Next, the catalyst slurry was allowed to flow from one end face of the honeycomb structure of Example 1 into the cells. To allow the catalyst slurry to flow into the cells, dipping was performed. The loading amount of the catalyst was 298 g/L. The "catalyst amount" column in Table 2 shows the catalyst loading amount (g/L).

TABLE 1

|   | End face diameter (mm) | Length (mm) | Thickness of partition wall (mm) | Cell density (cells/cm²) | Porosity (%) | Open frontal area (%) | Median opening diameter (μm) | Pore density (pores/mm²) | Wet area (μm²) | Circularity |
|---|---|---|---|---|---|---|---|---|---|---|
| Example 1 | 266.7 | 152.4 | 0.114 | 93.0 | 50 | 30 | 50 | 500 | 17121 | 2.5 |
| Example 2 | 266.7 | 152.4 | 0.140 | 62.0 | 45 | 25 | 40 | 400 | 16531 | 2.3 |
| Example 3 | 266.7 | 152.4 | 0.114 | 93.0 | 55 | 35 | 57 | 650 | 18205 | 2.9 |
| Example 4 | 266.7 | 152.4 | 0.140 | 62.0 | 65 | 40 | 60 | 700 | 19498 | 3.2 |
| Example 5 | 266.7 | 152.4 | 0.140 | 62.0 | 60 | 40 | 60 | 200 | 17961 | 2.6 |
| Example 6 | 266.7 | 152.4 | 0.114 | 93.0 | 65 | 50 | 59 | 420 | 17341 | 2 |
| Example 7 | 266.7 | 152.4 | 0.114 | 93.0 | 63 | 48 | 42 | 1000 | 18210 | 2.6 |
| Example 8 | 266.7 | 152.4 | 0.114 | 93.0 | 52 | 43 | 43 | 820 | 21495 | 4.0 |
| Example 9 | 266.7 | 152.4 | 0.114 | 93.0 | 58 | 47 | 52 | 530 | 17458 | 1.8 |
| Comparative Example 1 | 266.7 | 152.4 | 0.114 | 93.0 | 35 | 15 | 8 | 180 | 12531 | 2 |
| Comparative Example 2 | 266.7 | 152.4 | 0.114 | 93.0 | 70 | 42 | 60 | 1100 | 19338 | 3.3 |
| Comparative Example 3 | 266.7 | 152.4 | 0.140 | 62.0 | 65 | 24 | 20 | 350 | 21763 | 2.2 |
| Comparative Example 4 | 266.7 | 152.4 | 0.114 | 93.0 | 45 | 28 | 49 | 500 | 15571 | 2.0 |
| Comparative Example 5 | 266.7 | 152.4 | 0.114 | 93.0 | 50 | 29 | 50 | 300 | 15400 | 4.1 |
| Comparative Example 6 | 266.7 | 152.4 | 0.114 | 93.0 | 65 | 52 | 67 | 350 | 15400 | 2.6 |

TABLE 1-continued

| | End face diameter (mm) | Length (mm) | Thickness of partition wall (mm) | Cell density (cells/cm$^2$) | Porosity (%) | Open frontal area (%) | Median opening diameter (μm) | Pore density (pores/mm$^2$) | Wet area (μm$^2$) | Circularity |
|---|---|---|---|---|---|---|---|---|---|---|
| Comparative Example 7 | 266.7 | 152.4 | 0.114 | 93.0 | 45 | 18 | 60 | 220 | 16608 | 2.1 |
| Comparative Example 8 | 266.7 | 152.4 | 0.114 | 93.0 | 63 | 48 | 65 | 320 | 14525 | 3.3 |
| Comparative Example 9 | 266.7 | 152.4 | 0.114 | 93.0 | 50 | 25 | 48 | 560 | 16034 | 3.2 |
| Comparative Example 10 | 266.7 | 152.4 | 0.114 | 93.0 | 60 | 20 | 36 | 400 | 16565 | 1.7 |

TABLE 2

| | Catalyst amount (g/L) | Percentage of increase in pressure loss after catalyst coating (%) | Catalyst filling ratio (%) | NOx purification performance (%) | Isostatic strength (MPa) |
|---|---|---|---|---|---|
| Example 1 | 298 | 100 | 60 | 91 | 2.5 |
| Example 2 | 297 | 120 | 50 | 90 | 3.2 |
| Example 3 | 300 | 90 | 70 | 94 | 1.5 |
| Example 4 | 304 | 80 | 80 | 96 | 0.5 |
| Example 5 | 304 | 95 | 54 | 93 | 1.5 |
| Example 6 | 301 | 95 | 72 | 91 | 0.5 |
| Example 7 | 295 | 120 | 65 | 94 | 0.7 |
| Example 8 | 307 | 110 | 63 | 97 | 2.1 |
| Example 9 | 298 | 93 | 69 | 93 | 1.4 |
| Comparative Example 1 | 301 | 200 | 5 | 80 | 4.5 |
| Comparative Example 2 | 303 | 80 | 85 | 97 | 0.3 |
| Comparative Example 3 | 295 | 125 | 30 | 86 | 0.6 |
| Comparative Example 4 | 300 | 125 | 42 | 88 | 2.5 |
| Comparative Example 5 | 300 | 140 | 45 | 88 | 2.5 |
| Comparative Example 6 | 303 | 93 | 69 | 84 | 0.3 |
| Comparative Example 7 | 302 | 137 | 44 | 87 | 3 |
| Comparative Example 8 | 295 | 88 | 63 | 82 | 0.4 |
| Comparative Example 9 | 293 | 67 | 52 | 86 | 2.6 |
| Comparative Example 10 | 310 | 150 | 45 | 88 | 1.8 |

The "percentage of increase in pressure loss after catalyst coating (%)", the "catalyst filling ratio (%)", the "NOx purification performance", and the "isostatic strength (MPa)" of the honeycomb structure of Example 1 were evaluated by the following methods. The results are shown in Table 2.

[Percentage of Increase in Pressure Loss after Catalyst Coating (%)]

First, the difference of pressure between the inflow end face and the outflow end face of a honeycomb structure loaded with no catalyst was obtained at 25° C. For the measurement, a gas containing air was allowed to flow at a flow rate of 10 Nm$^3$/min into the honeycomb structure. The pressure loss value of the honeycomb structure with no catalyst obtained in this manner was regarded as "$P_0$". Separately, the difference of pressure between the inflow end face and the outflow end face of a honeycomb structure loaded with a catalyst in such a manner as to give the values shown in Table 2 was obtained at 25° C. The pressure loss value of the honeycomb structure with the catalyst obtained in this manner was regarded as "$P_1$". The value calculated in accordance with Equation (2) was referred to as the percentage of increase in pressure loss after catalyst coating (%). The acceptable value of the percentage of increase in pressure loss after catalyst coating (%) is 120% or less.

percentage of increase in pressure loss after catalyst coating (%)=$(P_1-P_0)/P_0 \times 100$   Equation (2)

[Catalyst Filling Ratio (%)]

Figure 4:
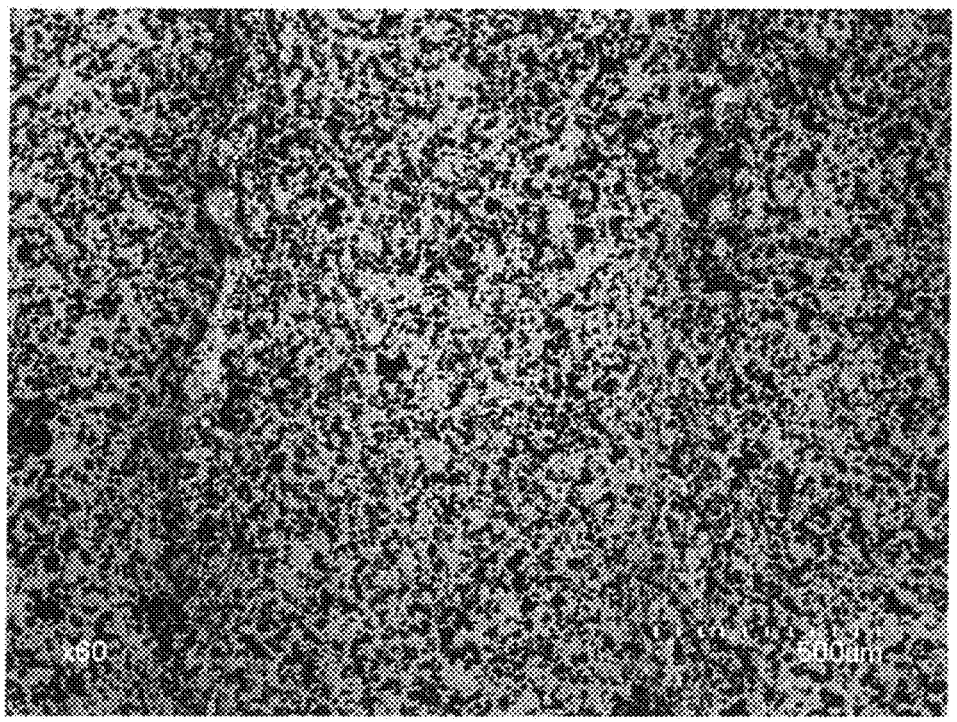
FIG. 4 is an SEM image of a sample cut out from a honeycomb structure body of a honeycomb structure in Example 1.

A measurement sample having a size of a length of 20 mm, a width of 20 mm, and a height of 20 mm was cut out from the honeycomb structure body of the honeycomb structure of Example 1. The partition wall portion of the sample was polished, and SEM images were recorded in randomly three visual fields under a scanning electron microscope (SEM). The size of a visual field was the width as one of partition wall in the X direction and a length of 600 μm in the Y direction. Next, a catalyst was loaded onto the honeycomb structure, and the ratio (percentage) of the volume ($V_1$) of pores actually filled with the catalyst to the volume ($V_0$) of all the pores formed on the partition walls was calculated. Specifically, the volume ($V_0$) of all the pores formed on the partition walls was calculated from the pore portions extracted by the binarization using an image analysis (i.e., pores into which no catalyst penetrated and pores into which a catalyst penetrated). Next, a catalyst was loaded onto the honeycomb structure. The image analysis was performed to binarize pores, then the pore portions into which the catalyst penetrated were extracted, and the volume $V_1$ was calculated. By using these values, the catalyst filling ratio (%) was calculated. The catalyst filling ratio (%) value in Table 2 is the arithmetic mean value of the catalyst filling ratios of the respective SEM images in the three visual fields. When the catalyst filling ratio is less than 50%, the catalyst amount on the partition wall surface may increase, thus the catalyst may be separated from the carrier at the time of actual use, and the purification performance may deteriorate. Hence, the acceptable value is 50% or more. FIG. 4 shows an SEM image of a sample cut out from the honeycomb structure body of the honeycomb structure in Example 1.

[NOx Purification Performance (%)]

A urea SCR system equipped with a six-cylinder diesel engine having a displacement of 8 L was used to evaluate a NOx purification performance. Through the honeycomb structure, an exhaust gas and urea required for a purification of NOx were allowed to pass, and the NOx amounts were determined at the front and rear of the honeycomb structure. The NOx purification performance (%) was calculated in accordance with 100−{(NOx amount at rear)/(NOx amount at front)}×100. The NOx purification performance was measured in conditions in which the exhaust gas temperature was 250° C. at a temperature measurement position 20 mm apart from the inflow end face of the honeycomb structure, the exhaust gas flow rate was 380 kg/h, and the NOx/NH$_3$ equivalent ratio was 1.0. The acceptable value of the NOx purification performance (%) is 90% or more.

[Isostatic Strength (MPa)]

An isostatic strength was measured on the basis of an isostatic breakdown strength test stipulated in a car standard (JASO Standard) M505-87 issued by the society of Automotive Engineers of Japan. The isostatic breakdown strength test is a test of placing the honeycomb structure in a tubular container of rubber and closing the container with a lid made of an aluminum plate to perform an isotropic pressurizing compression in water. That is, the isostatic breakdown strength test is a test which simulates a compressive load application in a case of holding a circumferential surface of the honeycomb structure in a can member. The isostatic strength measured by this isostatic breakdown strength test is indicated by an adding pressure value (MPa) when the honeycomb structure breaks. The acceptable value of the isostatic strength (MPa) is 0.5 MPa or more.

Example 2

In Example 2, the manufacturing method of the honeycomb structure in Example 1 was repeated except that the thickness of the partition wall was 0.140 mm, the number of cells was 62 cells/cm$^2$, and the amount of the pore former was 1.2 parts by mass, to manufacture a honeycomb structure.

Example 3

In Example 3, the manufacturing method of the honeycomb structure in Example 1 was repeated except that the amount of the pore former was 3.4 parts by mass, to manufacture a honeycomb structure.

Example 4

In Example 4, t the manufacturing method of the honeycomb structure in Example 1 was repeated except that the thickness of the partition wall was 0.140 mm, the number of cells was 62 cells/cm$^2$, and the amount of the pore former was 6.0 parts by mass, to manufacture a honeycomb structure.

Example 5

In Example 5, the manufacturing method of the honeycomb structure in Example 1 was repeated except that the thickness of the partition wall was 0.140 mm, the number of cells was 62 cells/cm$^2$, and the amount of the pore former was 4.5 parts by mass, to manufacture a honeycomb structure.

Example 6

In Example 6, the manufacturing method of the honeycomb structure in Example 1 was repeated except that the amount of the pore former was 6.0 parts by mass and the average particle diameter of the pore former was 25 to manufacture a honeycomb structure.

Example 7

In Example 7, the manufacturing method of the honeycomb structure in Example 1 was repeated except that the amount of the pore former was 6.0 parts by mass and the average particle diameter of the pore former was 15 μm, to manufacture a honeycomb structure.

Example 8

In Example 8, the manufacturing method of the honeycomb structure in Example 1 was repeated except that the average particle diameter of the pore former was 10 to manufacture a honeycomb structure.

Example 9

In Example 9, the manufacturing method of the honeycomb structure in Example 1 was repeated except that the amount of the pore former was 4.5 parts by mass and the average particle diameter of the pore former was 15 μm, to manufacture a honeycomb structure.

The thickness of partition wall, the cell density, the porosity, the open frontal area, the median opening diameter, the pore density, the wet area, and the circularity of each honeycomb structure of Examples 2 to 9 were measured in the same manner as in Example 1. The results are shown in Table 1. A catalyst was loaded onto each honeycomb structure of Examples 2 to 9 in such a manner as to give the catalyst amount (g/L) shown in Table 2. Next, the "percentage of increase in pressure loss after catalyst coating (%)", the "catalyst filling ratio (%)", the "NOx purification performance (%)", and the "isostatic strength (MPa)" were evaluated in the same manner as in Example 1. The results are shown in Table 2.

Comparative Examples 1 to 10

Figure 5:
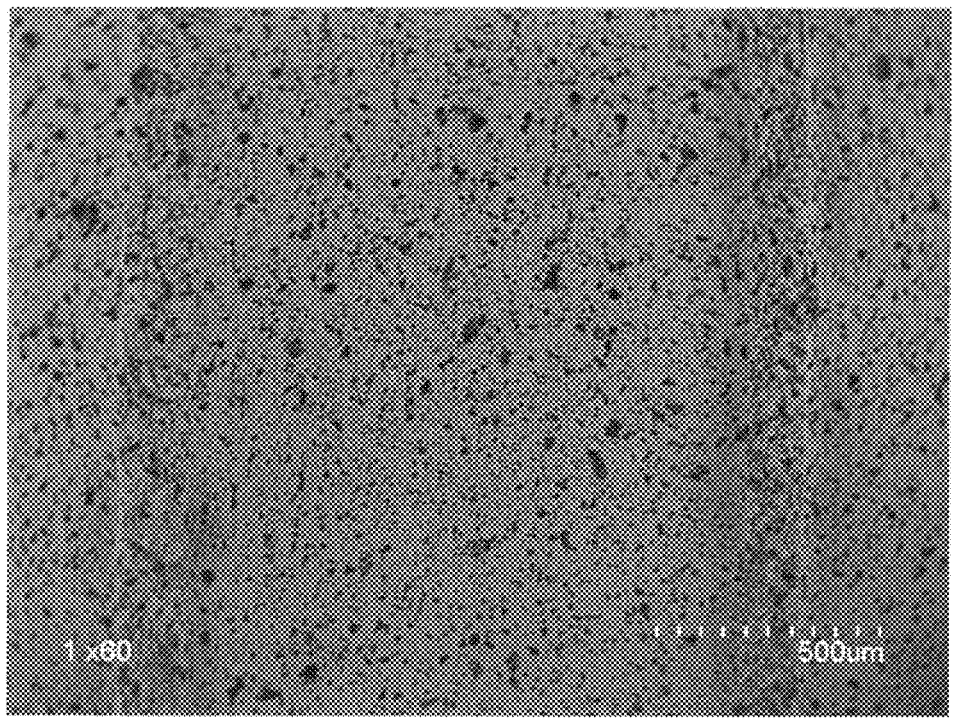
FIG. 5 is an SEM image of a sample cut out from a honeycomb structure body of a honeycomb structure in Comparative Example 1.

Honeycomb structures of Comparative Examples 1 to 10 were manufactured by the following procedures, and the thickness of partition wall, the cell density, the porosity, the open frontal area, the median opening diameter, the pore density, the wet area, and the circularity of each honeycomb structure were measured in the same manner as in Example 1. The results are shown in Table 1. A catalyst was loaded onto each honeycomb structure of Comparative Examples 1 to 10 in such a manner as to give the catalyst amount (g/L) shown in Table 2. Next, the "percentage of increase in pressure loss after catalyst coating (%)", the "catalyst filling ratio (%)", the "NOx purification performance (%)", and the "isostatic strength (MPa)" were evaluated in the same manner as in Example 1. The results are shown in Table 2. FIG. 5 shows an SEM image of a sample cut out from the honeycomb structure body of the honeycomb structure in Comparative Example 1.

In Comparative Example 1, the manufacturing method of the honeycomb structure in Example 1 was repeated except that no pore former was added, to manufacture a honeycomb structure.

In Comparative Example 2, the manufacturing method of the honeycomb structure in Example 1 was repeated except that the amount of the pore former was 6.6 parts by mass, to manufacture a honeycomb structure.

In Comparative Example 3, the manufacturing method of the honeycomb structure in Example 1 was repeated except that the amount of the pore former was 6.0 parts by mass and the average particle diameter of the pore former was 5 μm, to manufacture a honeycomb structure.

In Comparative Example 4, the manufacturing method of the honeycomb structure in Example 1 was repeated except that the amount of the pore former was 1.2 parts by mass and the average particle diameter of the pore former was 100 μm, to manufacture a honeycomb structure.

In Comparative Example 5, the manufacturing method of the honeycomb structure in Example 1 was repeated except that the amount of the pore former was 2.5 parts by mass and the average particle diameter of the pore former was 100 μm, to manufacture a honeycomb structure.

In Comparative Example 6, the manufacturing method of the honeycomb structure in Example 1 was repeated except that the amount of the pore former was 6.0 parts by mass and the average particle diameter of the pore former was 100 μm, to manufacture a honeycomb structure.

In Comparative Example 7, t the manufacturing method of the honeycomb structure in Example 1 was repeated except that the amount of the pore former was 1.2 parts by mass and the average particle diameter of the pore former was 70 μm, to manufacture a honeycomb structure.

In Comparative Example 8, the manufacturing method of the honeycomb structure in Example 1 was repeated except that the amount of the pore former was 6.0 parts by mass and the average particle diameter of the pore former was 150 μm, to manufacture a honeycomb structure.

In Comparative Example 9, the manufacturing method of the honeycomb structure in Example 1 was repeated except that the amount of the pore former was 2.5 parts by mass and the average particle diameter of the pore former was 130 μm, to manufacture a honeycomb structure.

In Comparative Example 10, the manufacturing method of the honeycomb structure in Example 1 was repeated except that the amount of the pore former was 4.5 parts by mass and the average particle diameter of the pore former was 5 μm, to manufacture a honeycomb structure.

[Results]

Each honeycomb structure of Examples 1 to 9 gave satisfactory results in the evaluations of a percentage of increase in pressure loss after catalyst coating, a catalyst filling ratio, a NOx purification performance, and an isostatic strength.

The honeycomb structure of Comparative Example 1 had an extremely low catalyst filling ratio which was 5% and a percentage of increase in pressure loss was 200% after catalyst coating. In addition, the honeycomb structure of Comparative Example 1 had a poor percentage of increase in pressure loss after catalyst coating, so a larger amount of the catalyst was hard to be loaded onto the honeycomb structure, and a NOx purification performance was low.

The honeycomb structure of Comparative Example 2 satisfied the acceptance values of a percentage of increase in pressure loss after catalyst coating, a catalyst filling ratio, and a NOx purification performance, it had however a markedly low isostatic strength.

The honeycomb structure of Comparative Example 3 had a low catalyst filling ratio which was 30% and a percentage of increase in pressure loss was 125% after catalyst coating. In the honeycomb structure of Comparative Example 4, a percentage of increase in pressure loss was 125% after catalyst coating. In addition, the honeycomb structure of Comparative Example 3, 4 had a poor percentage of increase in pressure loss after catalyst coating, so a larger amount of a catalyst was hard to be loaded onto the honeycomb structure, and a NOx purification performance was low. Each honeycomb structure of Comparative Examples 3 to 10 had a NOx purification performance of less than 90%, which failed to satisfy the acceptable value. The honeycomb structure of Comparative Example 6 had a large median opening diameter which was 67 μm and had a markedly low isostatic strength.

The honeycomb structure of the present invention can be used as an exhaust gas purification member for purification of the exhaust gas emitted from gasoline engines, diesel engines, and the like.

DESCRIPTION OF REFERENCE NUMERALS

1: partition wall, 2: cell, 3: circumferential wall, 4: honeycomb structure body, 11: inflow end face, 12: outflow end face, 100: honeycomb structure

What is claimed is:

1. A honeycomb structure comprising:
a honeycomb structure body including porous partition walls defining a plurality of cells serving as fluid passages extending from an inflow end face to an outflow end face;
wherein a porosity of the porous partition walls is from 45 to 65%, an open frontal area of pores each having an equivalent circle diameter of 10 μm or more among pores open on surfaces of the partition walls is from 20 to 50%, a pore density of pores having an equivalent circle diameter of 10 μm or more among pores open on surfaces of the porous partition walls is from 200 to 1,000 pores/mm$^2$, a median opening diameter of pores having an equivalent circle diameter of 10 μm or more among pores open on surfaces of the porous partition walls is from 40 to 60 μm, where the median opening diameter is a median value of the equivalent circle diameters, a circularity of pores having an equivalent circle diameter of 10 μm or more among the pores open on the surfaces of the partition walls is from 1.8 to 4.0, and a wet area of the porous partition walls is 16,500 μm$^2$ or more.

2. The honeycomb structure according to claim 1, wherein a wet area of the porous partition walls is 16,500 μm$^2$ or more and 21,500 μm$^2$ or less.

3. The honeycomb structure according to claim 1, wherein a thickness of the porous partition walls is from 89 to 203 μm.

4. The honeycomb structure according to claim 1, wherein a cell density of the honeycomb structure body is from 31 to 140 cells/cm$^2$.

5. The honeycomb structure according to claim 1, wherein a material of the porous partition walls includes at least one material selected from the group consisting of cordierite, silicon carbide, aluminum titanate, silicon nitride, and mullite.

6. The honeycomb structure according to claim 1, further comprising a plugging portion configured to plug one end of the plurality of cells formed in the honeycomb structure body.

7. The honeycomb structure according to claim 1, wherein a catalyst for purification of an exhaust gas is loaded onto at least one of the surfaces of the porous partition walls and pores of the partition walls of the honeycomb structure body.

8. The honeycomb structure according to claim 7, used for a purification of NOx contained in an exhaust gas emitted from an automobile.

9. The honeycomb structure according to claim 7, wherein the catalyst is a catalyst having a selective catalytic reduction function.

* * * * *